US008929230B2

(12) United States Patent
Wang et al.

(10) Patent No.: US 8,929,230 B2
(45) Date of Patent: Jan. 6, 2015

(54) COORDINATED SILENT PERIOD WITH SOUNDING REFERENCE SIGNAL (SRS) CONFIGURATION

(75) Inventors: Renqiu Wang, San Diego, CA (US); Durga Prasad Malladi, San Diego, CA (US); Hao Xu, San Diego, CA (US); Naga Bhushan, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 521 days.

(21) Appl. No.: 13/084,169

(22) Filed: Apr. 11, 2011

(65) Prior Publication Data

US 2011/0255431 A1 Oct. 20, 2011

Related U.S. Application Data

(60) Provisional application No. 61/324,705, filed on Apr. 15, 2010.

(51) Int. Cl.
*H04W 52/24* (2009.01)

(52) U.S. Cl.
USPC ........................... 370/252; 370/328; 370/265

(58) Field of Classification Search
USPC ......................................... 370/252, 265, 328
See application file for complete search history.

(56) References Cited

U.S. PATENT DOCUMENTS

| 7,986,681 | B2 | 7/2011 | Astely et al. | |
|---|---|---|---|---|
| 2005/0013283 | A1* | 1/2005 | Yoon et al. | 370/350 |
| 2005/0239451 | A1* | 10/2005 | Periyalwar et al. | 455/425 |
| 2008/0130483 | A1 | 6/2008 | Khandekar et al. | |
| 2008/0260062 | A1* | 10/2008 | Imamura | 375/267 |

FOREIGN PATENT DOCUMENTS

| CN | 1894873 A | 1/2007 |
|---|---|---|
| EP | 2124369 | 11/2009 |
| JP | 2007531347 A | 11/2007 |
| KR | 20090110346 A | 10/2009 |
| WO | 2005011163 A1 | 2/2005 |
| WO | 2008052194 A2 | 5/2008 |
| WO | WO 2008/052194 * | 5/2008 |
| WO | 2008130051 A1 | 10/2008 |
| WO | 2009035399 A1 | 3/2009 |

OTHER PUBLICATIONS

International Search Report and Written Opinion—PCT/US2011/032722, ISA/EPO—Jul. 14, 2011.
Qualcomm Incorporated: "SRS Enhancements for LTE-A", 3GPP TSG-RAN WG1 #60bis, Apr. 12-16, 2010, Beijing, China, R1-102341, pp. 1-4.

* cited by examiner

*Primary Examiner* — Man Phan
*Assistant Examiner* — Mewale Ambaye
(74) *Attorney, Agent, or Firm* — Ashish L. Patel

(57) ABSTRACT

A method of wireless communication includes configuring a virtual SRS (sounding reference signal) transmission to prompt a user equipment (UE) to use a shortened uplink transmission format to create a silent period at an end of a subframe. Reports are received from the UE indicating interference observed during the silent period.

20 Claims, 7 Drawing Sheets

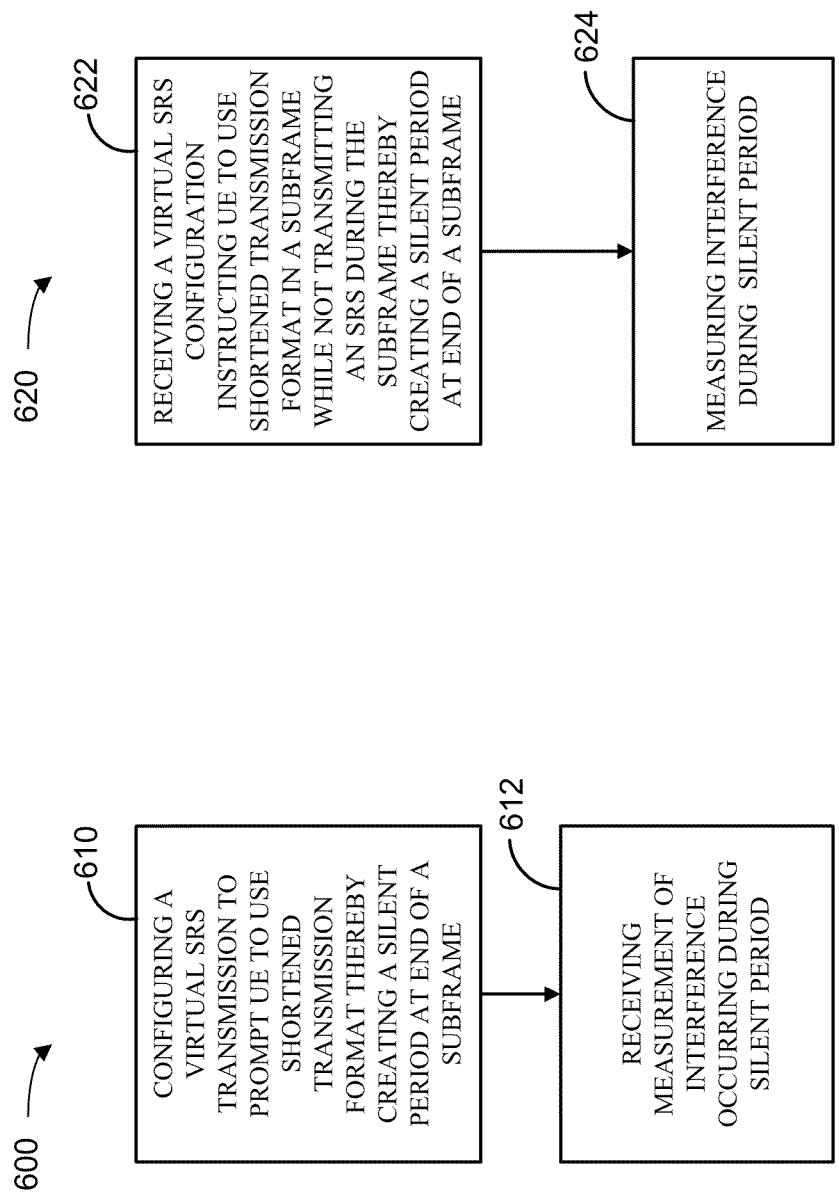

COORDINATED SILENT PERIOD WITH SOUNDING REFERENCE SIGNAL (SRS) CONFIGURATION

This application claims the benefit under 35 U.S.C. §119(e) to U.S. Provisional Patent Application Ser. No. 61/324,705 entitled "COORDINATED SILENT PERIOD WITH SOUNDING REFERENCE SIGNAL (SRS) CONFIGURATION IN ADVANCED LONG TERM EVOLUTION (LTE-A) NETWORKS," filed on Apr. 15, 2010, the disclosure of which is expressly incorporated by reference herein in its entirety.

BACKGROUND

1. Field

Aspects of the present disclosure relate generally to wireless communication systems, and more particularly to interference management based on uplink silent periods.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect, a method of wireless communication is disclosed. The method includes configuring a virtual SRS (sounding reference signal) transmission to prompt a user equipment (UE) to use a shortened uplink transmission format and create a silent period at an end of a subframe. Reports of interference observed during the silent period are received from the UE.

In another aspect, a method of wireless communication discloses receiving a virtual SRS (sounding reference signal) configuration instructing a user equipment (UE) to use a shortened uplink transmission format in a subframe while not transmitting an SRS during the subframe and creating a silent period at an end of the subframe. During the silent period, interference is measured.

In another aspect, an apparatus is disclosed. The apparatus includes means for configuring a virtual SRS (sounding reference signal) transmission to prompt a user equipment (UE) to use a shortened uplink transmission format and to create a silent period at an end of a subframe. A means for receiving reports of interference observed during the silent period from the UE is also included.

In one aspect, an apparatus for wireless communication includes means for receiving a virtual SRS (sounding reference signal) configuration that instructs a user equipment (UE) to use a shortened uplink transmission format in a subframe while not transmitting an SRS during the subframe to create a silent period at an end of the subframe. A means for measuring interference during the silent period is also included.

In another aspect, a computer program product for wireless communications in a wireless network is disclosed. The computer readable medium has program code recorded thereon which, when executed by one or more processors, cause the one or more processors to perform operations of configuring a virtual SRS (sounding reference signal) transmission to prompt a user equipment (UE) to use a shortened uplink transmission format to create a silent period at an end of a subframe. The program code also causes the one or more processors to receive, from the UE, reports of interference observed during the silent period.

Another aspect discloses a computer program product for wireless communications in a wireless network. The computer readable medium has program code recorded thereon which, when executed by one or more processors, cause the one or more processors to perform operations of receiving a virtual SRS (sounding reference signal) configuration instructing a user equipment (UE) to use a shortened uplink transmission format in a subframe while not transmitting an SRS during the subframe. Not transmitting creates a silent period at an end of the subframe. The program code also causes the one or more processors to measure interference during the silent period.

Another aspect discloses a system for wireless communication having a memory and at least one processor coupled to the memory. The processor(s) is configured to configure a virtual SRS (sounding reference signal) transmission to prompt a user equipment (UE) to use a shortened uplink transmission format to create a silent period at an end of a subframe. The processor is also configured to receive, from the UE, reports of interference observed during the silent period.

In another aspect, a system for wireless communication having a memory and at least one processor coupled to the memory is disclosed. The processor(s) is configured to receive a virtual SRS (sounding reference signal) configuration instructing a user equipment (UE) to use a shortened uplink transmission format in a subframe while not transmitting an SRS during the subframe to create a silent period at an end of the subframe. The processor is also configured to measure interference during the silent period.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 6A-6B are block diagrams illustrating a method for coordinating silent periods with configured SRS transmissions.

DETAILED DESCRIPTION

Figure 1:
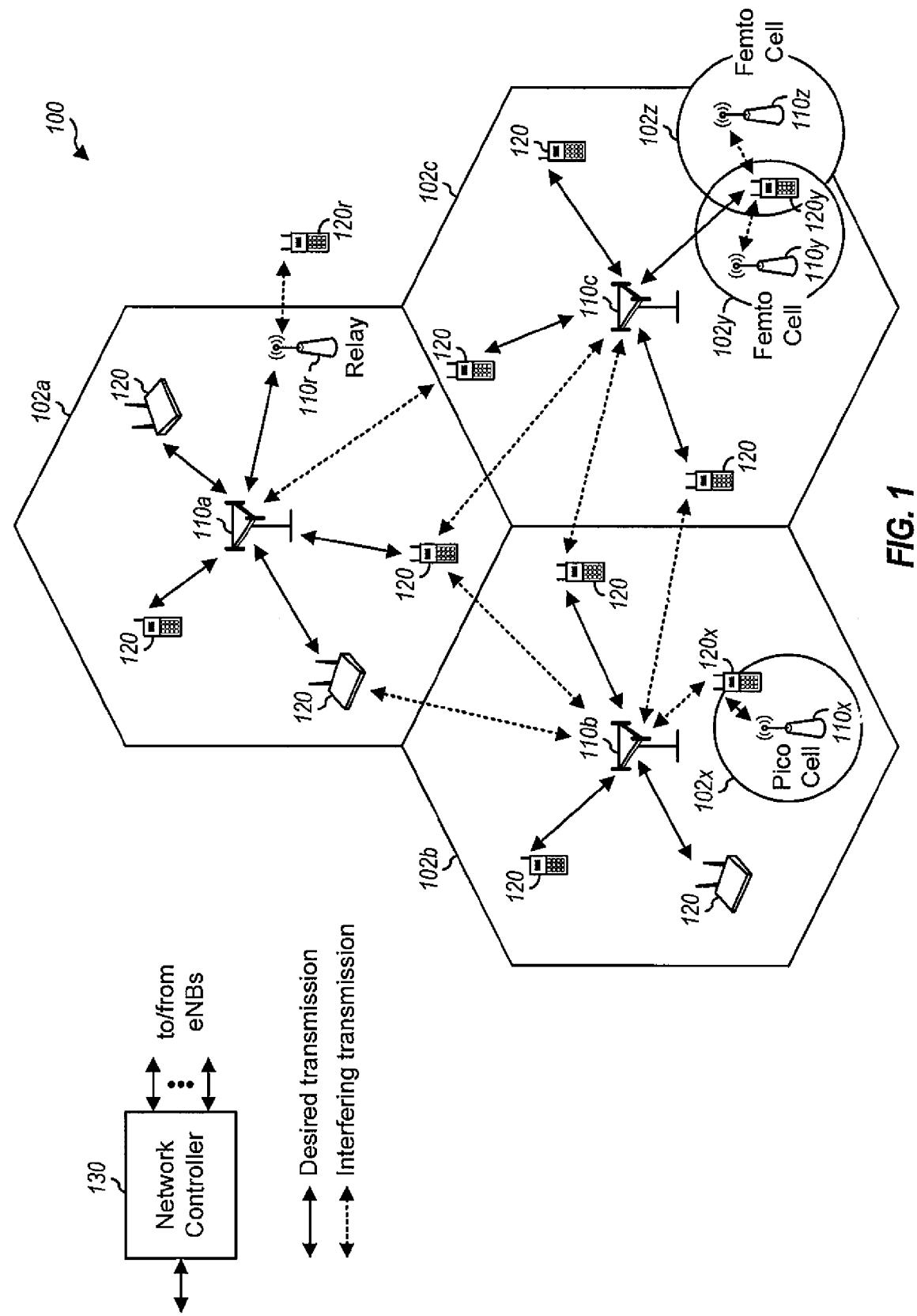
FIG. 1 is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE-A network. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul 132. The eNodeBs 110 may also communicate with one another, e.g., directly or indirectly via a wireless backhaul 134 or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10 or 20 MHz, respectively.

Figure 2:
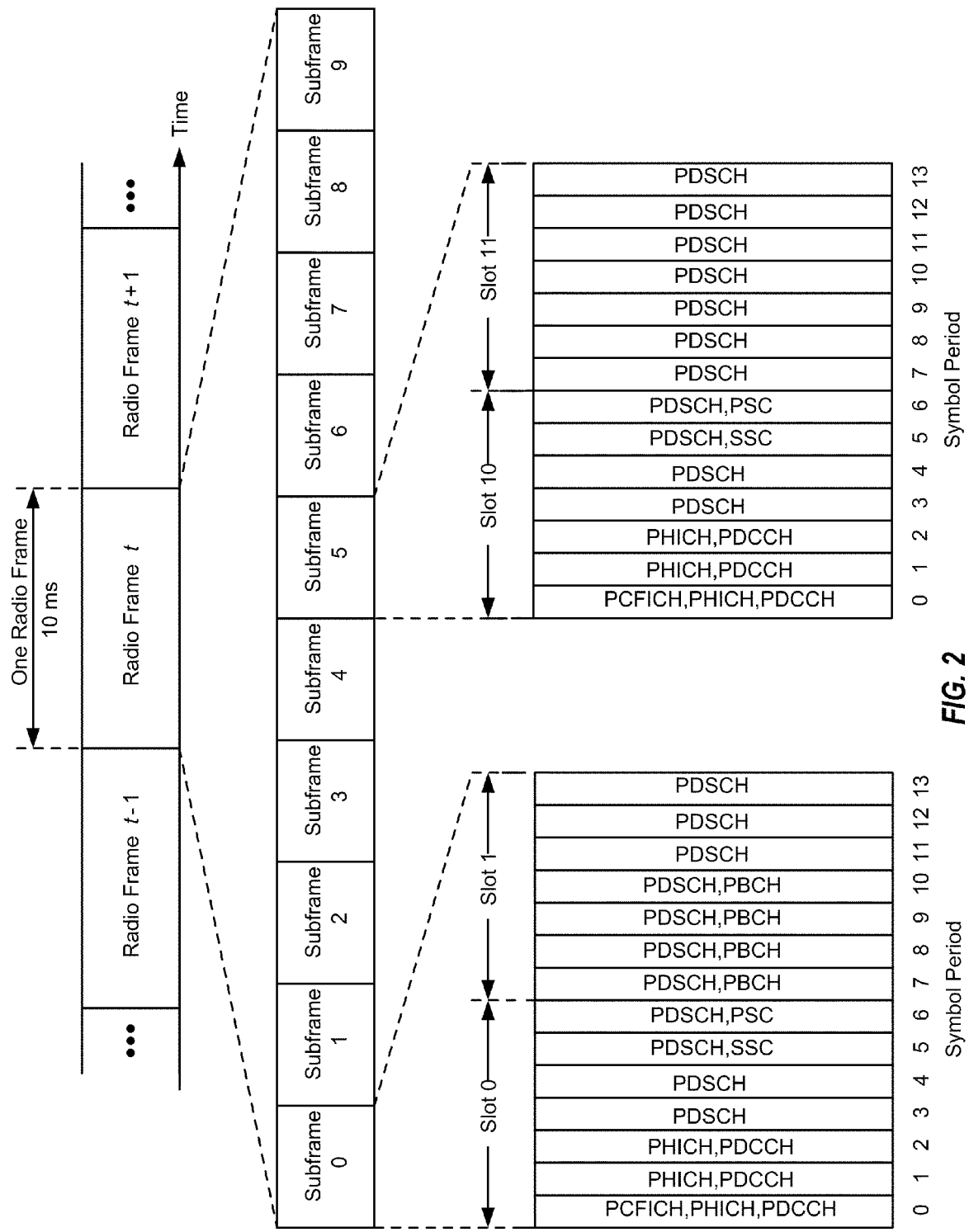
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3A:
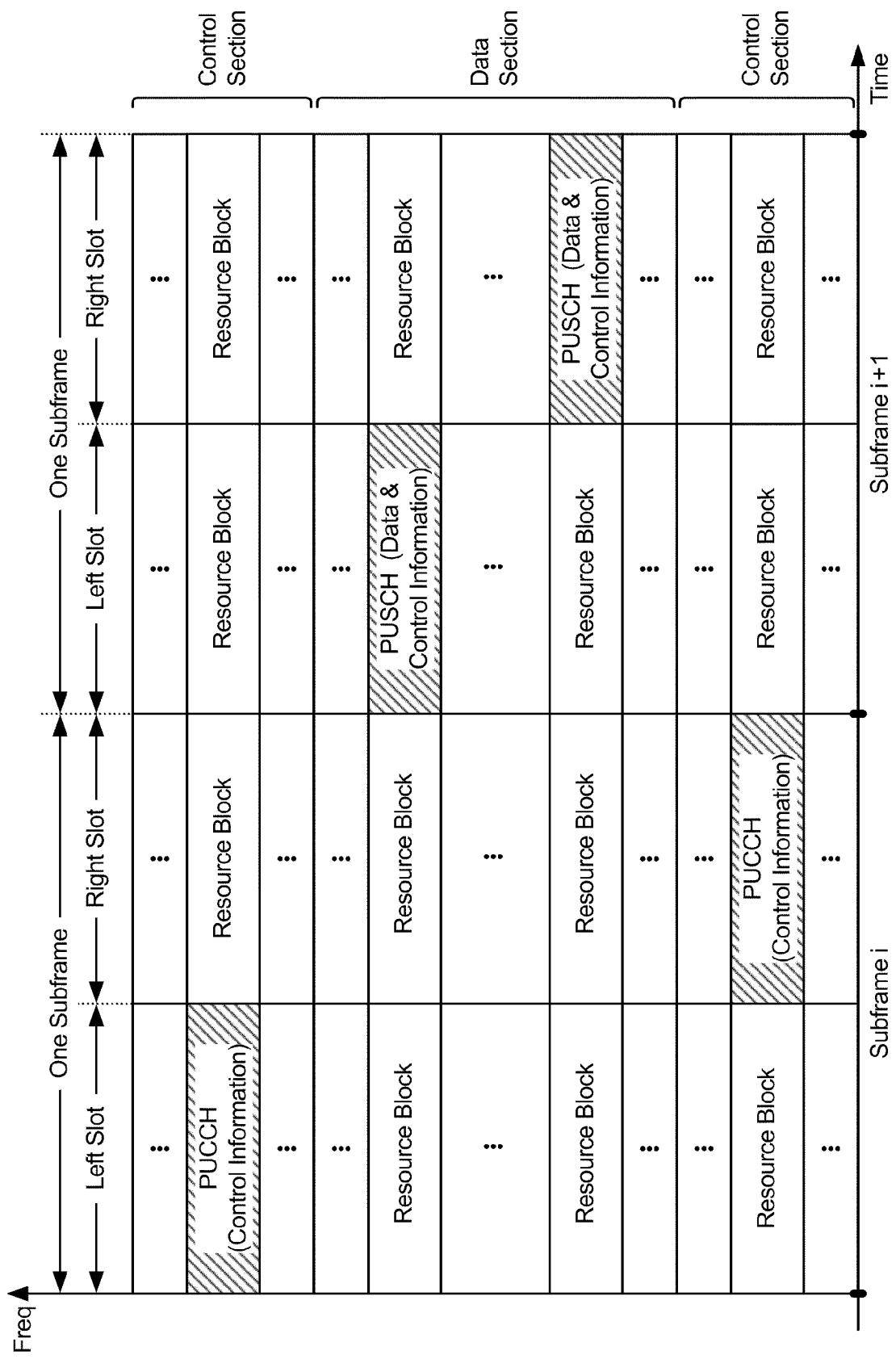
FIG. 3a-3b are block diagrams conceptually illustrating example frame structures in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC, SSC, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
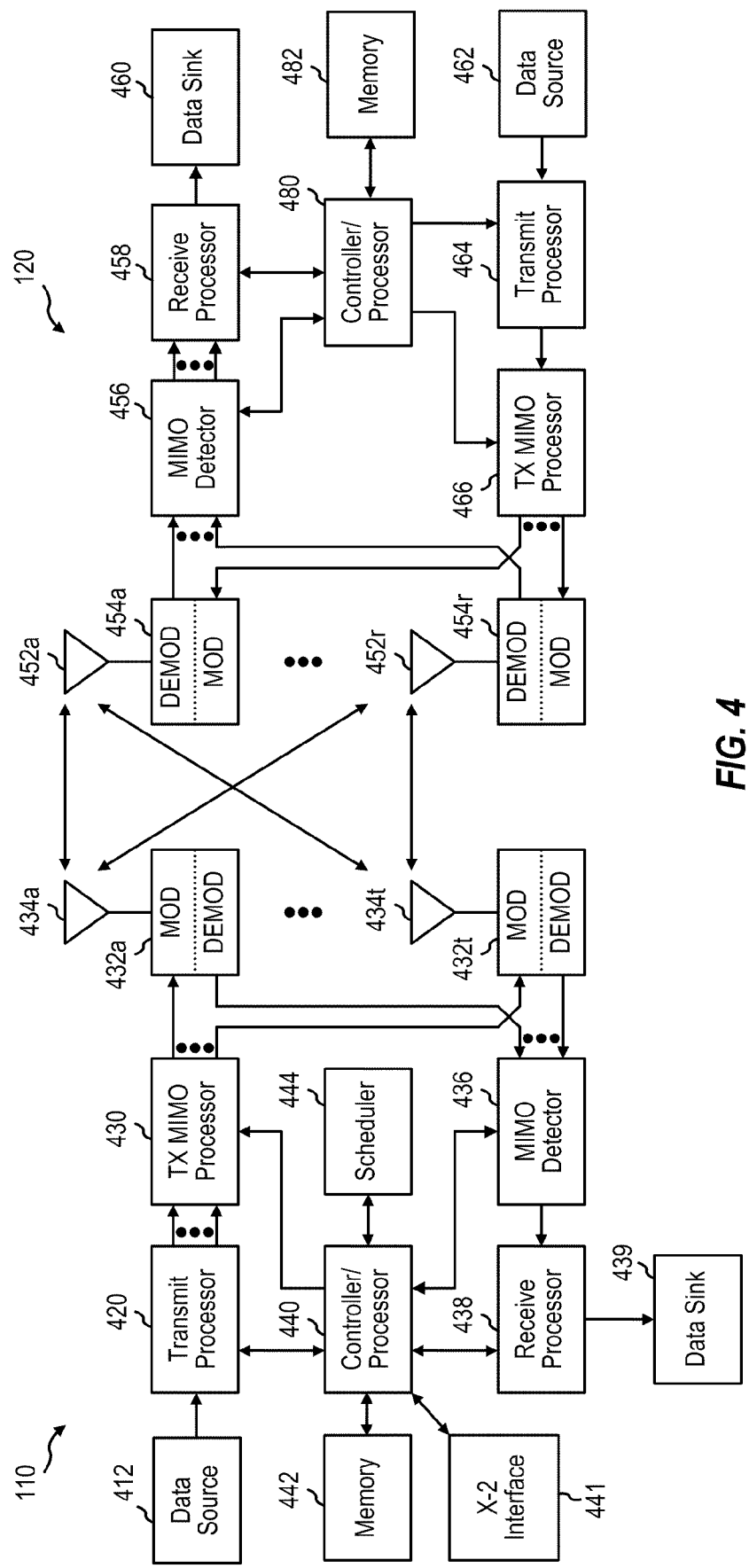
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in FIG. 6, and/or other processes for the techniques described herein. The memories 442 and 482 may store data and program codes for the base station 110 and the UE 120, respectively. A scheduler 444 may schedule UEs for data transmission on the downlink and/or uplink.

Inter-cell interference control (ICIC) may be used for interference management among macro eNodeBs, between different power classes in a heterogeneous network and for peer-to-peer (P2P) discovery and communications. Generally, implementing inter-cell interference control includes obtaining an interference over thermal (IoT) estimate. In evaluating the interference estimate for uplink communications, not only are intra-cell and inter-cell interference coupled, but also, thermal noise is difficult to separate from the interference of other UEs. As these various types of interference are coupled together, it may be difficult to estimate the portion of the interference attributed to thermal noise as well as the portion attributed to interference from other UEs.

One aspect of the disclosure provides a method for estimating the interference level and if configured properly for estimating the thermal noise. In one example, configured periods of silence are coordinated to allow for an accurate interference over thermal (IoT) measurement of other cell interference and/or other power class interference. In particular, a virtual SRS (sounding reference signal) may be configured to create a silent period (or a silent symbol) within a transmitted subframe.

Typically, SRS is transmitted in the last OFDM symbol. There are fourteen symbols for the normal cyclic prefix (CP) and twelve symbols for the extended cyclic prefix. In one example, the last symbol is configured as empty, and the interference over thermal (IoT) level may be measured within the silent symbol period.

Figure 3B:
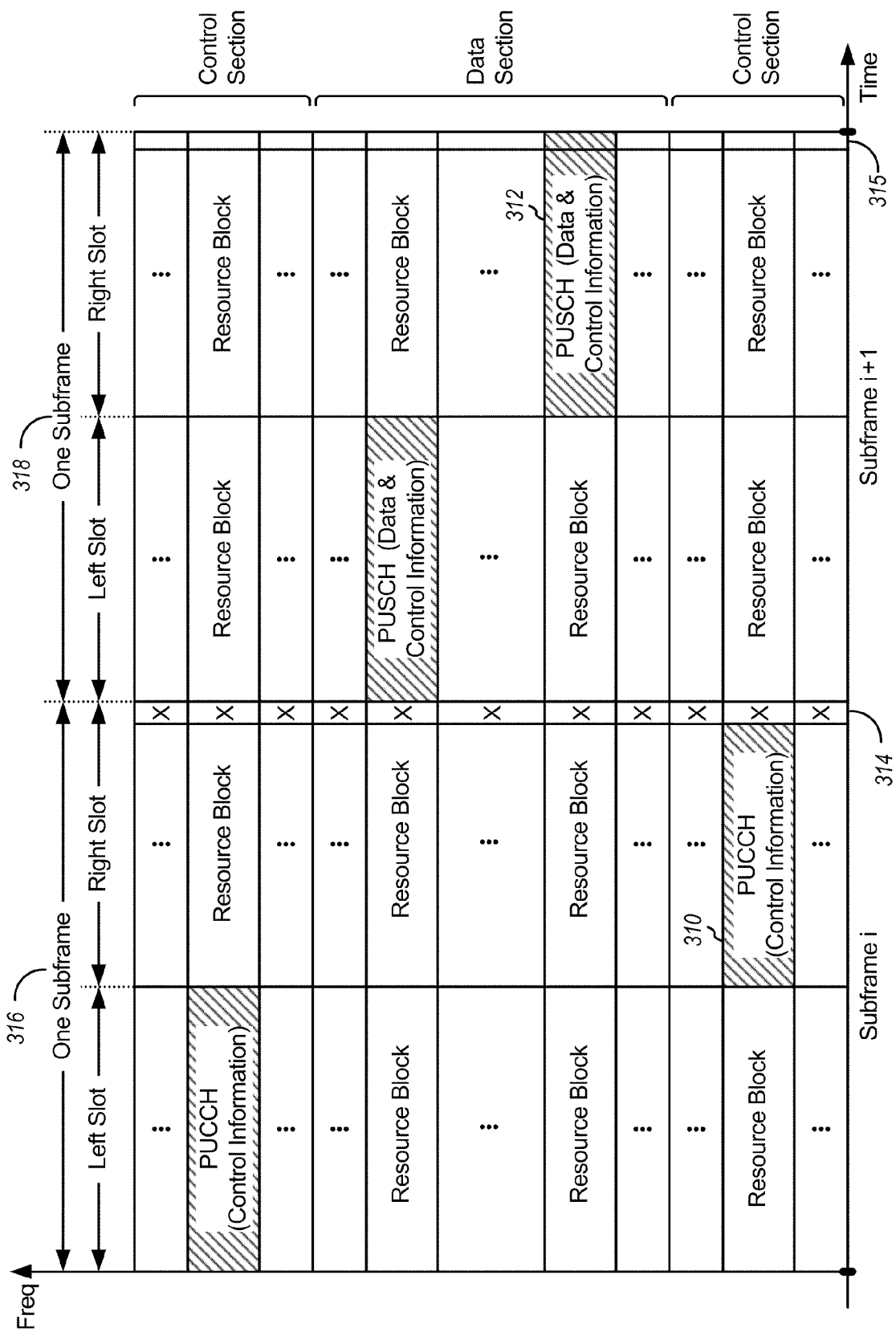

Referring to FIG. 3B, SRS may be configured in the last OFDM symbol 314, 315 of a subframe, such as subframes 316 and 318. When SRS is configured other channels are shortened or punctured so as not to collide with the SRS in the last symbol. For example, the PUCCH 310 occupies thirteen symbols of the subframe 316, rather than fourteen. Likewise, when SRS is configured, the PUSCH 312 occupies only thirteen symbols of the subframe 318. The eNodeB configures SRS, and may also control when the SRS is transmitted. The configuration information from the eNodeB is shared by all UEs thereby allowing the UEs to know when the last symbol is used for SRS transmission so the UEs can then use a shortened format for the control/data transmission.

In one example, a silent period may be coordinated within a UE group via a virtual SRS. Those skilled in the art will appreciate the UE group may include macro UEs, femto UEs, P2P (peer to peer) devices and the like. In one example the cell and UE specific SRS transmissions are configured such that particular uplink channels are transmitted with shortened formats. Although the virtual SRS transmission is scheduled for one symbol, no UEs in the group will actually transmit an SRS. The UEs use a shortened format for their respective PUSCH and PUCCH transmissions because the UEs believe the SRS will be transmitted. Accordingly, a silent symbol is created in the last slot of the subframe, such as the slots 314, 315. Additionally, the normal communications are not interrupted. The interference from another cell/group may be measured within the created silent period. In other words, when the UE cells/groups are coordinated to be silent on the last symbol together, there will be no inter-cell interference, and therefore the measurements will only include the thermal noise. Additionally, the measurement provides an estimate that excludes intra-cell interference because none of the UEs in the group transmits in the last symbol. Those skilled in the art will appreciate that in alternate examples a silent period may be created in the last two slots of the subframes 316, 318. In one aspect, the virtual SRS transmission may be configured with the maximum allowable number of resource blocks and desired periodicity. In another aspect, the virtual SRS is transmitted with zero power.

As the eNodeB knows the SRS configuration and knows the last symbol is empty, the eNodeB can measure the energy in the last symbol. The measured energy is the combination of thermal energy plus other cell interference. In other words the measurements yield a combined measurement of thermal energy plus inter-cell interference from other users in the same cell.

In another aspect, different levels of coordination may be configured. In one example, intra-cell coordination may be configured. With intra-cell coordination, an eNodeB may control silent period configurations within its own cell. In particular, intra-cell coordination allows for configuring a silent period on the last symbol with certain periodicity, within a cell. The eNodeB can control the SRS transmission of its cell, and other cell interference may be estimated. Because it is unknown what information (e.g., PUCCH, PUSCH, SRS) is being transmitted in other cells, intra-cell coordination does not identify any particular UE causing the strong interference. An analysis of the scheduling history may pin point the interfering UE(s). Once the interfering UE(s) are identified, power control may be applied to the UE(s) to decrease the interference level. Although intra-cell coordination is discussed, these concepts apply equally to intra-group coordination.

In another example, inter-cell coordination may be implemented. With inter-cell coordination, two or more cells are coordinated so that when one cell is silent on the last symbol, the other cell(s) are transmitting SRS. In an example including an eNodeB A and an eNodeB B, the eNodeB A may configure its UEs to be silent in a particular period and the eNodeB B can configure its UEs to only transmit SRS during this particular period. Additionally, eNodeB A can estimate the interference from eNodeB B and send the estimate to eNodeB B. The eNodeB B obtains a difference of values across the frequency domain, and the eNodeB B can compare its SRS configuration and then pinpoint the particular UE(s) that is a source of interference. This allows the eNodeB A to reduce interference of other cells by reducing power. Although inter-cell coordination is discussed, these concepts apply equally to inter-group coordination.

Another example provides for configuring a coordinated silent period for peer to peer (P2P) devices. If two UEs are close in distance, the UEs may be able to bypass the eNodeB and communicate directly with each other. These UEs are referred to as peer to peer UEs. Cell specific SRS instances allow for creating uplink silence periods in the last symbol of a configured subframe. Cell specific SRS configurations determine when SRS may be transmitted from all UEs in the cell. The UE specific SRS configurations map onto cell specific subframes. For example, macro UEs could be assigned to odd number subframes whereas peer to peer UEs could be assigned to even number subframes. Interlacing the UE specific SRS configurations allows for grouping users in separate subframes. The UE specific SRS configurations determine when SRS may be transmitted from a particular UE.

Figure 5:
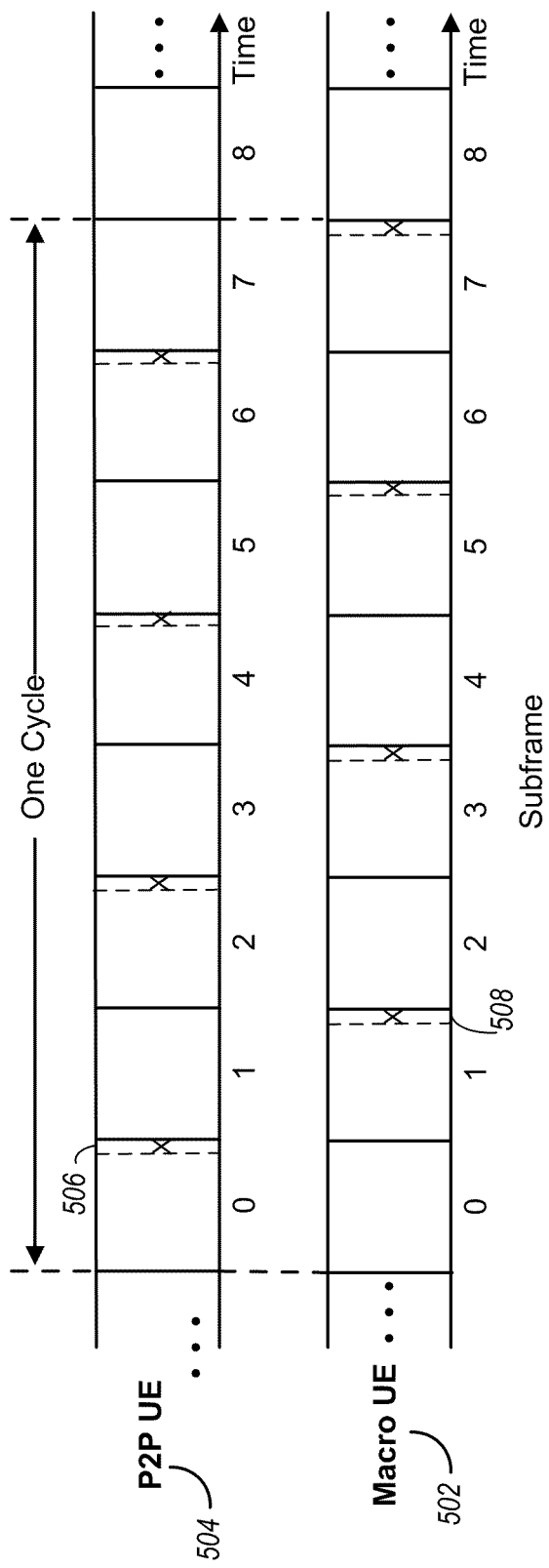
FIG. 5 is a block diagram illustrating coordinated SRS transmissions between macro UEs and peer to peer devices.

If a pair of peer to peer UEs coexists with the macro network, they will all share the same resources, and there will be mutual interference between the macro UEs and the P2P UEs. In one example, the amount of interference the P2P UEs and macros UEs experience may be reduced or minimized by applying interference control. The UEs may be divided into two groups: macro UEs and P2P UEs. The SRS transmission may be configured so that the macro UEs transmit SRS in even subframes. For example, referring to FIG. 5, the macro UEs 502 transmits SRS only in the even subframes. Additionally, SRS is configured such that all P2P UEs 504 transmit SRS only in odd subframes. In even subframes, all P2P UEs 504 will be silent in the last symbol 506, and the P2P UEs 504 can estimate the macro UE interference. Similarly, in odd subframes, the macro UEs 502 will be silent in the last symbol 508, and the macro UEs 502 can estimate the P2P UE interference. The obtained interference estimations may be used for interference control. Additionally, the eNode B can apply power control to the macro UEs based on the obtained interference estimations. In one aspect, the interference is measured with a granularity of 4 resource blocks (or the minimum granularity allowed for SRS transmission).

In another example, silent periods may be coordinated to provide for peer to peer inter-group interference management. Peer to peer groups may be interlaced across UE specific SRS configurations. In other words, each peer to peer group is configured to be silent in a different subframe, so each peer to peer group can estimate interference from other peer to peer groups. In this example, the macro UEs and peer to peer devices are expected to obey rules of cell specific SRS. In other words, SRS symbols are not transmitted in subframes that do not belong to the UE specific configuration. Interference measurements across multiple interlaces allows for the capture of interference from macro UEs and other P2P groups. The measurements are conveyed across group owners of P2P groups to allow for distributed power control and interference management.

Although the preceding description was primarily with respect to macro UEs, other power classes are also contemplated. For example, a remote radio head group and a peer to peer group may be able to isolate interference from each other.

In one configuration, the eNodeB 110 is configured for wireless communication including means for configuring a virtual SRS transmission. In one aspect, the configuring means may be the controller/processor 440 and/or scheduler 444 configured to perform the functions recited by the configuring means. The eNodeB 110 is also configured to include a means for measuring interference. In one aspect, the measuring means may be the receive processor 438 configured to perform the functions recited by the measuring means. In another aspect, the aforementioned means may be a module or any apparatus configured to perform the functions recited by the aforementioned means.

In another configuration, the UE 120 is configured for wireless communication including means for receiving a virtual SRS (sounding reference signal) configuration. In one aspect, the receiving means may be the demodulators 454a-454r, receive processor 458, controller/processor 480 and/or memory 482 configured to perform the functions recited by the configuring means. The UE 120 is also configured to include a means for measuring interference. In one aspect, the measuring means may be the demodulators 454a-454r, receive processor 458, controller/processor 480 and/or memory 482 configured to perform the functions recited by the measuring means. In another aspect, the aforementioned means may be a module or any apparatus configured to perform the functions recited by the aforementioned means.

FIG. 6A illustrates a method 600 for coordinating silent periods with configured virtual SRS transmissions. In block 602, an eNodeB configures a virtual SRS transmission to prompt a UE to use a shortened transmission format. The shortened transmission format thereby creates a silent period at the end of a subframe. In block 604, the eNodeB receives reports of interference measured during the silent period.

FIG. 6B illustrates a method 620 for coordinating silent periods with configured virtual SRS transmissions. In block 622, a UE receives a virtual SRS configuration instructing the UE to use a shortened transmission format in a subframe and to not transmit an SRS during the subframe. Not transmitting creates a silent period at an end of the subframe. In block 624, interference during the silent period is measured.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for inter-cell interference control (ICIC), comprising:
    configuring a virtual SRS (sounding reference signal) transmission to prompt a user equipment (UE) to use a shortened uplink transmission format and creating a silent period at an end of a subframe; and
    receiving, from the UE, reports of interference observed during the silent period.

2. The method of claim 1, in which the observed interference includes thermal noise and other interference.

3. The method of claim 1, further comprising applying information from the reports during ICIC (inter-cell interference control) to adjust a power and rate of the UE.

4. The method of claim 1, further comprising:
    configuring the virtual SRS transmission of a first power class of UEs in a first type of subframe;
    configuring the virtual SRS transmission of peer to peer UEs in a second type of subframe; and
    receiving, from the peer to peer UEs, second reports of interference from the first power class of UEs observed during the silent period and during transmission of the second type of subframe.

5. The method of claim 1, further comprising:
    configuring the virtual SRS transmission for a first peer to peer UE group in a first type of subframe;
    configuring the virtual SRS transmission of a second peer to peer UE group in a second type of subframe; and
    receiving, from the second peer to peer UE group, second reports of interference from the first peer to peer UE group observed during the silent period and during transmission of the second type of subframe.

6. The method of claim 1, further comprising coordinating the virtual SRS transmission with at least one eNode B to enable measuring thermal noise.

7. The method of claim 1, further comprising coordinating the virtual SRS transmission with at least one eNode B to locate at least one interfering UE.

8. A method for inter-cell interference control (ICIC), comprising:
    receiving a virtual SRS (sounding reference signal) configuration instructing a user equipment (UE) to use a shortened uplink transmission format in a subframe while not transmitting an SRS during the subframe and creating a silent period at an end of the subframe; and
    measuring interference during the silent period.

9. An apparatus for wireless communication, comprising:
    means for configuring a virtual SRS (sounding reference signal) transmission to prompt a user equipment (UE) to use a shortened uplink transmission format and creating a silent period at an end of a subframe; and
    means for receiving, from the UE, reports of interference observed during the silent period.

10. An apparatus for wireless communication, comprising:
    means for receiving a virtual SRS (sounding reference signal) configuration instructing a user equipment (UE) to use a shortened uplink transmission format in a subframe while not transmitting an SRS during the subframe and creating a silent period at an end of the subframe; and
    means for measuring interference during the silent period.

11. A computer program product for wireless communication in a wireless network, comprising:
    a non-transitory computer-readable medium having a program code recorded thereon, the program code comprising:
    program code to configure a virtual SRS (sounding reference signal) transmission to prompt a user equipment (UE) to use a shortened uplink transmission format and creating a silent period at an end of a subframe; and
    program code to receive, from the UE, reports of interference observed during the silent period.

12. A computer program product for wireless communication in a wireless network, comprising:
    a non-transitory computer-readable medium having a program code recorded thereon, the program code comprising:
    program code to receive a virtual SRS (sounding reference signal) configuration instructing a user equipment (UE) to use a shortened uplink transmission format in a subframe while not transmitting an SRS during the subframe and creating a silent period at an end of the subframe; and
    program code to measure interference during the silent period.

13. A system for wireless communication, comprising:
    a memory; and
    at least one processor coupled to the memory, the at least one processor being configured:

to configure a virtual SRS (sounding reference signal) transmission to prompt a user equipment (UE) to use a shortened uplink transmission format and creating a silent period at an end of a subframe; and to receive, from the UE, reports of interference observed during the silent period.

14. The system of claim 13, in which the observed interference includes thermal noise and other interference.

15. The system of claim 13, in which the processor is further configured to apply information from the reports during ICIC (inter-cell interference control) to adjust a power and rate of the UE.

16. The system of claim 13, in which the processor is further configured:

to configure the virtual SRS transmission of a first power class of UEs in a first type of subframe;

to configure the virtual SRS transmission of peer to peer UEs in a second type of subframe; and to receive, from the peer to peer UEs, second reports of interference from the first power class of UEs observed during the silent period and during transmission of the second type of subframe.

17. The system of claim 13, in which the processor is further configured:

to configure the virtual SRS transmission for a first peer to peer UE group in a first type of subframe;

to configure the virtual SRS transmission of a second peer to peer UE group in a second type of subframe; and to receive, from the second peer to peer UE group, second reports of interference from the first peer to peer UE group observed during the silent period and during transmission of the second type of subframe.

18. The system of claim 13, in which the processor is further configured to coordinate the virtual SRS transmission with at least one eNode B to enable measuring thermal noise.

19. The system of claim 13, in which the processor is further configured to coordinate the virtual SRS transmission with at least one eNode B to locate at least one interfering UE.

20. A system for wireless communication, comprising:

a memory; and at least one processor coupled to the memory, the at least one processor being configured:

to receive a virtual SRS (sounding reference signal) configuration instructing a user equipment (UE) to use a shortened uplink transmission format in a subframe while not transmitting an SRS during the subframe and creating a silent period at an end of the subframe; and to measure interference during the silent period.

* * * * *